(12) United States Patent
Miyazaki

(10) Patent No.: US 7,822,319 B2
(45) Date of Patent: Oct. 26, 2010

(54) AUTOMATIC RECORDING/REPRODUCING METHOD AND AUTOMATIC RECORDING/REPRODUCING APPARATUS

(75) Inventor: Koji Miyazaki, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1174 days.

(21) Appl. No.: 11/400,218

(22) Filed: Apr. 10, 2006

(65) Prior Publication Data

US 2006/0239641 A1    Oct. 26, 2006

(30) Foreign Application Priority Data

Apr. 11, 2005   (JP)   .............. 2005-113661
Mar. 27, 2006   (JP)   .............. 2006-086284

(51) Int. Cl.
*H04N 5/91* (2006.01)
(52) U.S. Cl. .................... 386/83; 386/123; 386/124; 386/37; 386/35; 386/46; 725/39; 725/53; 725/48; 725/59; 725/61
(58) Field of Classification Search ............... 386/123, 386/37, 35, 124, 46, 83; 725/39, 53, 48, 725/59, 61
See application file for complete search history.

(56) References Cited

U.S. PATENT DOCUMENTS

| | | | | |
|---|---|---|---|---|
| 5,375,230 | A * | 12/1994 | Fujimori | 713/323 |
| 6,252,629 | B1 * | 6/2001 | Takatori | 348/460 |
| 6,985,191 | B2 * | 1/2006 | Choi | 348/730 |

| | | | | |
|---|---|---|---|---|
| 2001/0030918 | A1 * | 10/2001 | Tabuchi et al. | 369/47.12 |
| 2005/0031307 | A1 * | 2/2005 | Kudo | 386/83 |
| 2005/0169610 | A1 * | 8/2005 | Ono | 386/124 |
| 2006/0114360 | A1 * | 6/2006 | Kortum et al. | 348/730 |

FOREIGN PATENT DOCUMENTS

| | | |
|---|---|---|
| JP | 08-065588 | 3/1996 |
| JP | 08-329558 | 12/1996 |
| JP | 10-162448 | 6/1998 |
| JP | 2000-276489 | 10/2000 |
| JP | 2000-287140 | 10/2000 |
| JP | 2001-167491 | 6/2001 |
| JP | 2002-101374 | 4/2002 |
| JP | 2002-109863 | 4/2002 |

(Continued)

OTHER PUBLICATIONS

Japanese Office Action dated Nov. 17, 2009 for Appln. No. 2006-086284.

(Continued)

*Primary Examiner*—Thai Tran
*Assistant Examiner*—Helen Shibru
(74) *Attorney, Agent, or Firm*—Pillsbury Winthrop Shaw Pittman, LLP

(57) ABSTRACT

Recording reservation information of a plurality of programs is grouped and at least the latest program among the programs recorded on the basis of the reservation information is left on a recording medium. Therefore, a program information registration unit to register a plurality of items of recording reservation information as groups and a reserved program recording control unit to record the reserved programs onto the recording medium and leave at least the latest program among the programs recorded on the recording medium to delete the others on the basis of the reservation information.

8 Claims, 14 Drawing Sheets

FOREIGN PATENT DOCUMENTS

| | | |
|---|---|---|
| JP | 2002-354380 | 12/2002 |
| JP | 2003-169263 | 6/2003 |
| JP | 2002-199293 | 7/2003 |
| JP | 2003-189213 | 7/2003 |
| JP | 2004-096530 | 3/2004 |
| JP | 2004-220696 | 8/2004 |
| JP | 2004-265477 | 9/2004 |
| JP | 2004-342195 | 12/2004 |
| JP | 2005-012693 | 1/2005 |

OTHER PUBLICATIONS

Japanese Office Action dated Nov. 17, 2009 for Appln. No. 2008-183308.
Japanese Office Action dated Nov. 17, 2009 for Appln. No. 2008-183309.
Japanese Office Action dated Nov. 17, 2009 for Appln. No. 2008-183310.
Japanese Office Action dated Nov. 17, 2009 for Appln. No. 2008-183311.
Japanese Office Action dated Nov. 17, 2009 for Appln. No. 2008-183312.
Japanese Office Action dated Nov. 17, 2009 for Appln. No. 2008-183313.
Japanese Office Action dated Nov. 17, 2009 for Appln. No. 2008-183314.
Japanese Office Action dated Nov. 17, 2009 for Appln. No. 2008-183315.
Japanese Office Action dated Jun. 1, 2010 for Appln. No. 2006-086284.
Japanese Office Action dated Jun. 1, 2010 for Appln. No. 2008-183308.
Japanese Office Action dated Jun. 1, 2010 for Appln. No. 2008-183310.
Japanese Office Action dated Jun. 1, 2010 for Appln. No. 2008-183313.
Japanese Office Action dated Jun. 1, 2010 for Appln. No. 2008-183315.
"Instruction Book, Product No. DV-HD300, Hitachi, Ltd."; China, 2003; pp. 1-127.
Japanese Office Action dated Feb. 16, 2010 for Appln. No. 2006-086284.
Japanese Office Action dated Feb. 16, 2010 for Appln. No. 2008-183308.
Japanese Office Action dated Feb. 16, 2010 for Appln. No. 2008-183309.
Japanese Office Action dated Feb. 16, 2010 for Appln. No. 2008-183310.
Japanese Office Action dated Feb. 16, 2010 for Appln. No. 2008-183312.
Japanese Office Action dated Feb. 16, 2010 for Appln. No. 2008-183313.
Japanese Office Action dated Feb. 16, 2010 for Appln. No. 2008-183314.
Japanese Office Action dated Feb. 16, 2010 for Appln. No. 2008-183315.

* cited by examiner

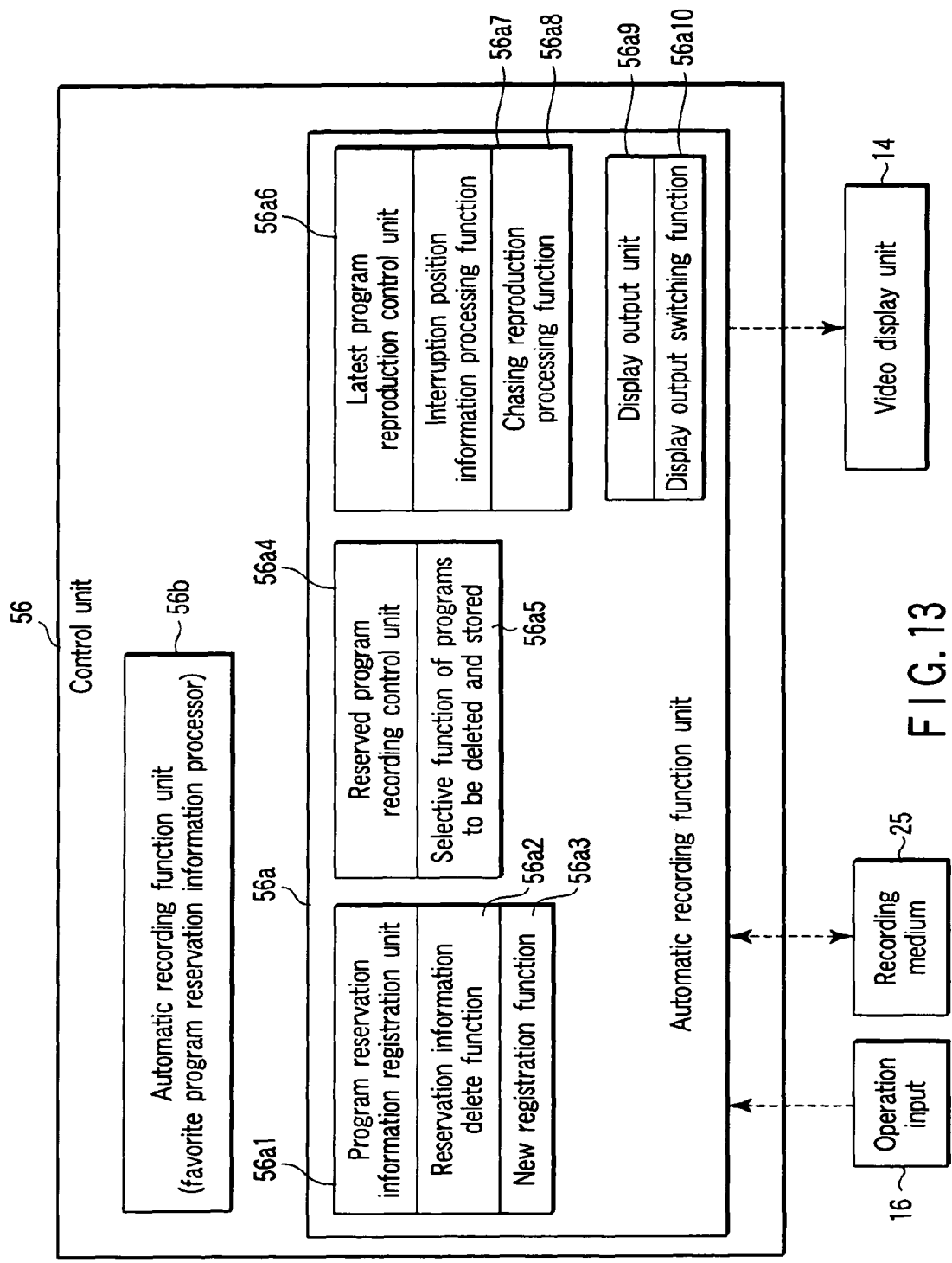
F I G. 13

AUTOMATIC RECORDING/REPRODUCING METHOD AND AUTOMATIC RECORDING/REPRODUCING APPARATUS

CROSS-REFERENCE TO RELATED APPLICATIONS

This application is based upon and claims the benefit of priority from Japanese Patent Applications No. 2005-113661, filed Apr. 11, 2005; and No. 2006-086284, filed Mar. 27, 2006, the entire contents of both of which are incorporated herein by reference.

BACKGROUND

1. Field

Embodiments of the present invention relate to an automatic recording/reproducing method and an automatic recording/reproducing apparatus. For example, one embodiment of the present invention relates to a method or an apparatus which automatically records a desired program onto a recording medium by using electronic program guide (EPG) information.

2. Description of the Related Art

In recent years, an information recording medium such as a hard disk and an optical disk as a recording medium has been increased in its storage capacity. Therefore, a method and an apparatus for automatically recording a desired program on a recording medium by connecting recording/reproducing equipment using such the recording medium to, for example, a television receiver have been prevailed. Program recording reservation information is prepared by using the EPG information so as to realize an automatic recording function and an automatic recording/reproducing apparatus. It has been taken into consideration for an apparatus to automatically set the recording reservation information by automatically searching for a program related to the concerned category from the EPG information when a desired category is specified (refer to, for example, Japanese Patent Application Publication (KOKAI) 2004-220696).

As mentioned above, the program recording reservation information (including such as a broadcast start time and a broadcast ending time of a reserved program) prepared by referring to the EPG information or an instruction manual is stored on a memory and the apparatus is brought into a standby state. Then, when a timer detects the broadcast start time of the reserved program, the apparatus executes recording of the reserved program in the corresponding broadcast time slot.

A conventional apparatus; however records all of a plurality of reserved programs or categories. For example, the reservation for a plurality of news programs different in time slot causes to record all these programs.

However, it may be sufficient for a user to view the latest news program, so that the recording of old news programs is a waste of time. And in terms of the weather forecast, it is sufficient for the user to view the latest forecast program, and thus recording old whether forecast programs is a waste of time.

BRIEF SUMMARY OF THE INVENTION

An object of the present invention is to provide an automatic recording/reproducing method and an automatic recording/reproducing apparatus.

One embodiment of the present invention is configured to reproduce the latest program recorded according to a group recording reservation on the recording medium when a predetermined user operation is performed.

The embodiment of the present invention has a program reservation information registration unit which registers a group recording reservation of a part of a plurality of recording reservations; a recording control unit which records reserved programs corresponding to the group recording reservation on a recording medium; a reproduction control unit which reproduces the program at the last recorded according to the group recording reservation on the recording medium when a predetermined user operation is performed; and an output unit which outputs an output reproduced by the reproduction control unit to a display unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 13 is an exemplary view for showing a block diagram of functions included in the automatic recording function unit constituting the featured part of the broadcast receiver regarding the present invention.

DETAILED DESCRIPTION

Various embodiments according to the invention will be described hereinafter with reference to the accompanying drawings.

Figure 1:
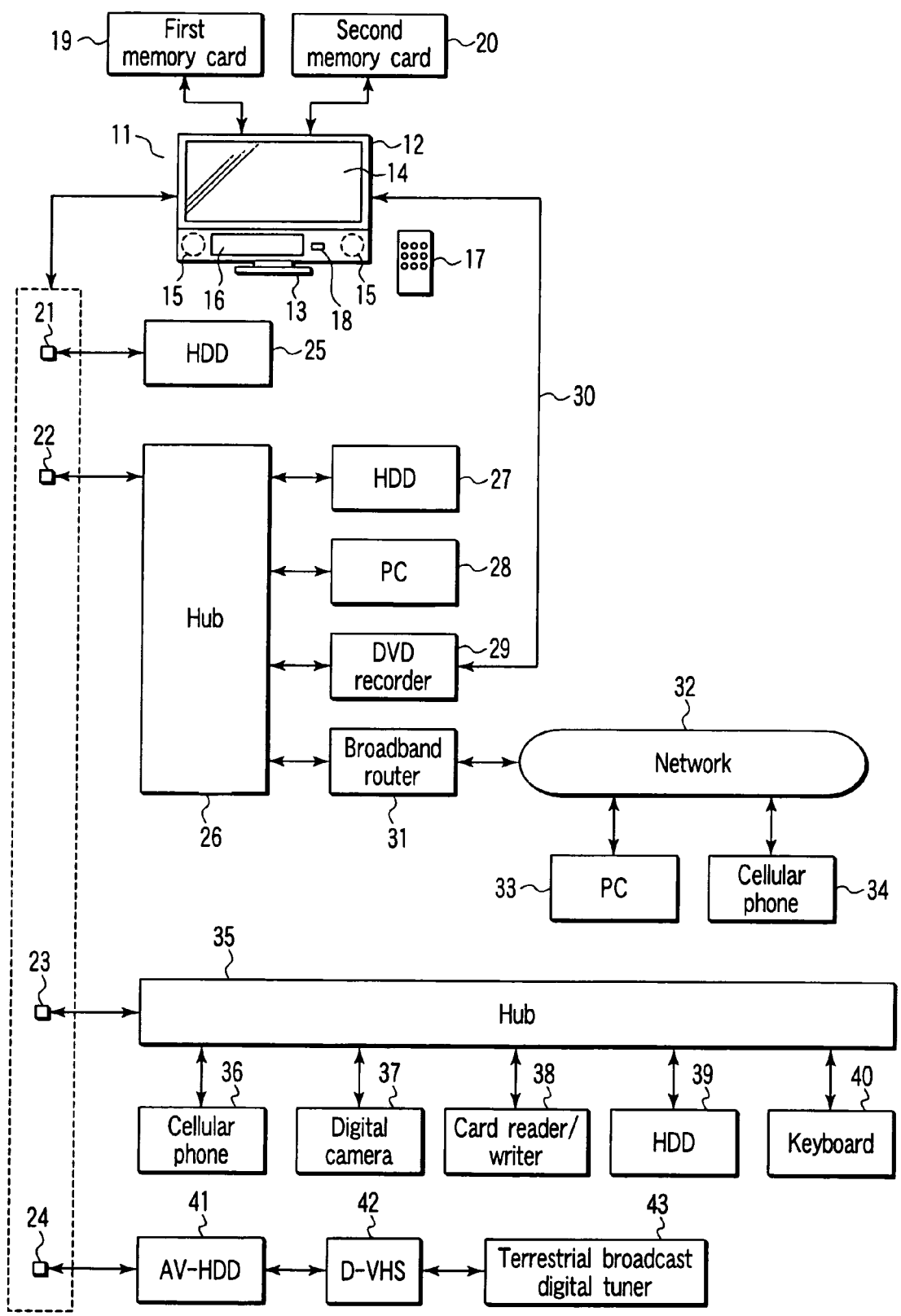
FIG. 1 is an exemplary view for explaining an outline of a digital television broadcast receiver to which the present invention is adopted.

FIG. 1 schematically shows an embodiment of the external appearance of a digital television broadcast receiver 11 of this embodiment and a network system configured around the broadcast receiver 11.

The broadcast receiver 11 is composed mainly of a thin cabinet 12 and a support base 13, which raises and supports the cabinet 12. The cabinet 12 is provided with a flat panel type video display unit 14 composed of a liquid crystal display panel or the like, a loudspeaker 15, an operation unit 16, and a light receiving unit 18 to receive operation information transmitted from a remote controller 17.

The broadcast receiver 11 is adapted to receive a first detachable memory card 19 such as a secure digital (SD) memory card, a multimedia card (MMC) or a memory stick, and performs recording/reproducing of information about a program or a photograph, for example, to and from the first memory card 19.

The broadcast receiver 11 is further adapted to receive a second detachable memory card (IC card) 20 with, for example, contract information recorded thereon and performs recording/reproducing of information to and from the second memory card 20.

The broadcast receiver 11 is provided with a first local area network (LAN) terminal 21, a second LAN terminal 22, a universal serial bus (USB) terminal 23 and an i.Link (registered trademark) terminal 24.

Among these terminals, the first LAN terminal 21 is used as a LAN-compatible HDD dedicated port. The first LAN terminal 21 is connected to a LAN-compatible HDD 25 being a network attached storage (NAS). The first LAN terminal 21 is used to record/reproduce information via Ethernet (registered trademark).

As mentioned above, by providing the first LAN terminal 21 to be the LAN-compatible HDD dedicated port, the broadcast receiver 11 can record a program with a high image quality to the HDD 25 without being influenced by other network environment or the status of use of the network.

The second LAN terminal 22 is used as a general LAN-compatible port using Ethernet. The second LAN terminal 22 is connected to equipment, for example, a LAN-compatible HDD 27, personal computer (PC) 28, and a digital versatile disk (DVD) recorder 29 with a built-in HDD through a hub 26.

Since digital information communicated through the second LAN terminal 22 is control information, the DVD recorder 29 utilizes a dedicated analogue transmission path 30 to transmit analog information of video and sound to the broadcast receiver 11.

The second LAN terminal 22 is connected to, for example, a network 32 such as the Internet via a broadband router 31 connected to the hub 26 and used to communicate information between a PC 33, a cellular phone 34 or the like, and the broadcast receiver 11 via the network 32.

The USB terminal 23 is used as a general USB-compatible port, connected to, for example, a cellular phone 36, a digital camera 37, a card reader/writer 38 for a memory card, an HDD 39, or a keyboard 40. The USB terminal is used to make information transmissions between the equipment and the broadcast receiver 11.

The foregoing i.Link terminal 24 serially connects an AV-HDD 41, a digital (D)-video home system (VHS) 42, etc. and supports information transmissions between the equipment and the broadcast receiver 11.

Figure 2:
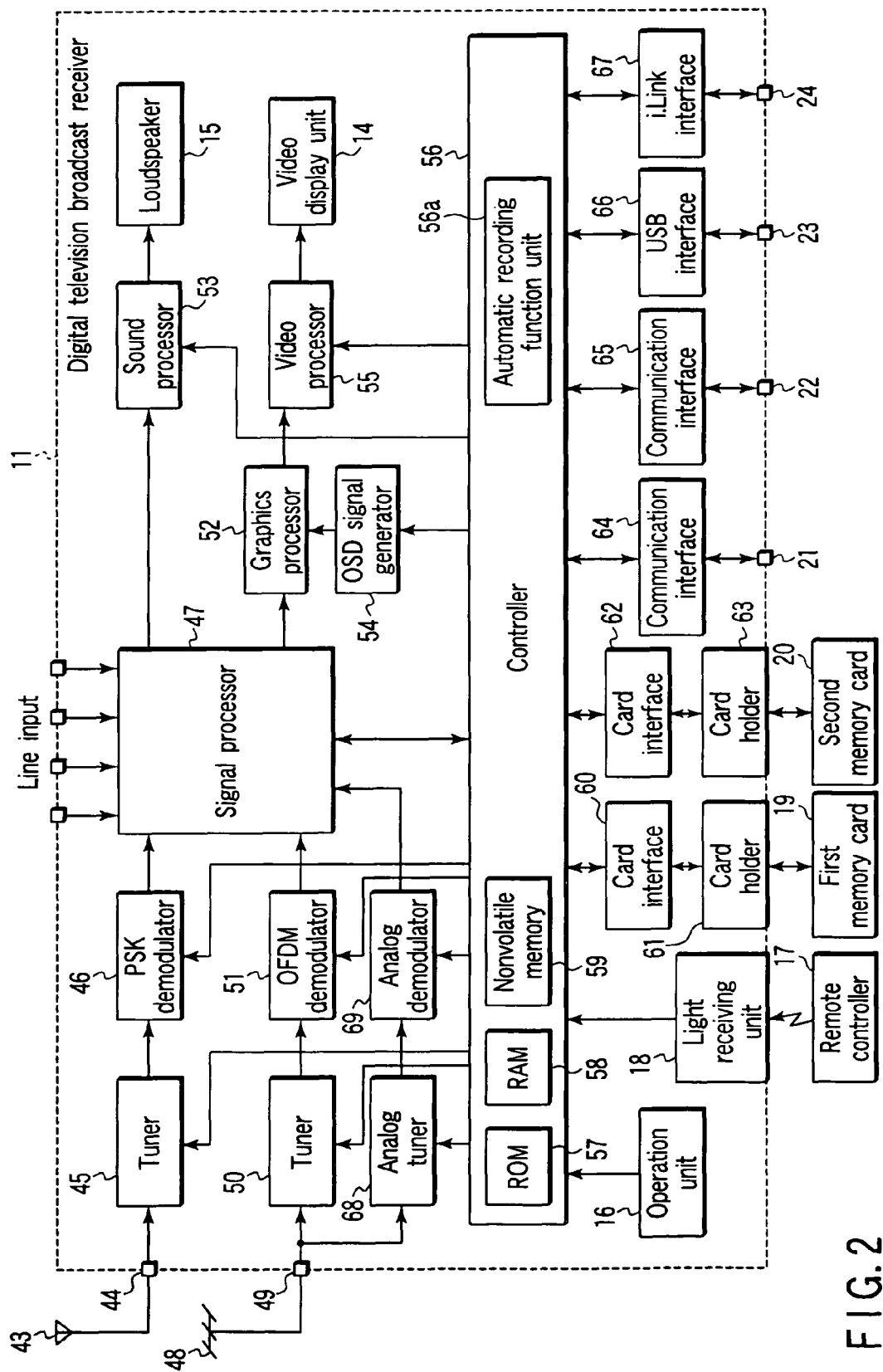
FIG. 2 is an exemplary view for further specifically showing a configuration of the inside of the broadcast receiver in FIG. 1.

FIG. 2 shows the principle signal processing series of the foregoing broadcast receiver 11. That is, a satellite digital television broadcast signal, received at an antenna 43 for receiving BS/CS digital broadcast, is supplied to a tuner 45 for satellite digital broadcast through an input terminal 44, and the tuner 45 tunes a broadcast signal of a desired channel.

The broadcast signal tuned by the tuner 45 is fed to a phase shift keying (PSK) demodulator 46 to be demodulated to a digital video signal and a digital sound signal, which are output to a signal processor 47.

The broadcast receiver 11 also has an analog tuner 68 for receiving a terrestrial analog signal. An analog demodulator 69 demodulates the signal received by the analog tuner 68 to output it to the signal processor 47.

A terrestrial digital television broadcast signal, received at a second antenna 48 for receiving terrestrial digital broadcast, is supplied to a tuner 50 for the terrestrial digital television broadcast via an input terminal 49. The tuner 50 tunes the broadcast signal of the desired channel.

The broadcast signal tuned by the tuner 50 is supplied to an orthogonal frequency division multiplexing (OFDM) demodulator 51 to be demodulated to a digital video signal and a digital sound signal then are supplied to the signal processor 47.

The signal processor 47 selectively conducts prescribed digital signal processing of the digital video signals and sound signals supplied from the PSK demodulator 46 and from the OFDM demodulator 51. The signal processor 47 processes the video signals and analog signals supplied from the analog demodulator 69 and further from the line input terminals, and outputs an output signal to a graphics processor 52 and a sound processor 53.

Among the processors, the graphics processor 52 has a function to superimpose an on-screen display (OSD) signal generated from an OSD signal generator 54 on the digital video signal supplied from the signal processor 47 to output the superimposed signal. The graphics processor 52 can selectively output the video signal output from the signal processor 47 and the OSD signal output from the signal generator 54 and also combine to output both outputs so that both outputs configure a half of a screen, respectively.

The digital video signal output from the graphics processor 52 is supplied to a video processor 55. The video processor 55 converts the input digital video signal into an analog video signal in a format possible to be displayed on the video display unit 14 and outputs the analog video signal to the video display unit 14 to produce a video display.

The sound processor 53 converts an analog sound signal in a format that can be reproduced by the loudspeaker 15 and outputs the analog sound signal to the loudspeaker 15 to make a sound reproduction.

As further shown in FIG. 2, the broadcast receiver 11 further comprises a control unit 56. The control unit 56 has a built-in central processing unit (CPU), which receives operation information from the operation unit 16, or receives operation information transmitted from the remote controller 17 and respectively controls each part so as to reflect operation contents thereto.

In this case, the control unit 56 mainly uses a read only memory (ROM) 57 with a control program to be executed by the CPU stored thereon, a random access memory (RAM) 58 to provide an operation area for the CPU, and a nonvolatile memory 59 in which a variety of items of setting information and control information are stored.

The control unit 56 is connected to a card holder 61 to which the first memory card 19 can be attached through a card interface 60. The control unit 56 is adapted to support the exchange of information transmissions with the first memory card 19 attached to the card holder 61 through the card interface 60.

The control unit 56 is further connected to a card holder 63 to which the second memory card 20 can be attached through a card interface 62. The control unit 56 thereby can communicate information with the second memory card 20 attached to the card holder 63 through the card interface 62.

The control unit 56 is also connected to the first LAN terminal 21 through a communication interface 64. The control unit 56 thereby can communicate with the LAN-compatible HDD 25 connected to the first LAN terminal 21 through the communication interface 64. In this case, the control unit 56 has a dynamic host configuration protocol (DHCP) server function and assigns an Internet protocol (IP) address to the LAN-compatible HDD 25 connected to the first LAN terminal 21 to control the HDD 25.

The control unit 56 is further connected to the second LAN terminal 22 through a communication interface 65. The control unit 56 thereby can communicate with any equipment (refer to FIG. 1) connected to the second LAN terminal 22 through the communication interface 65.

The control unit 56 is further connected to the USB terminal 23 through a USB interface 66. The control unit 56 thereby can communicate with any equipment (refer to FIG. 1) connected to the USB terminal 23 through the USB interface 66.

Furthermore, the control unit 56 is connected to the i.Link terminal 24 through an i.Link interface 67. Thereby, the control unit 56 can communicate with any equipment (refer to FIG. 1) connected to the i.Link terminal 24 through the i.Link interface 67.

The control unit 56 includes an automatic recording function unit 56a functioning as a below-described grouped recording reservation information processor. The recording function unit 56a may be referred to as a "Latest News" processor, or a "latest news" processor. The recording function unit 56a is different from an ordinary automatic recording function unit (here, referred to as a second automatic recording function unit) to record and store all programs reserved for recording in accordance with an electronic program table and an instruction manual and provided independently from the second automatic recording function unit. The recording function unit 56a has a function to automatically delete the old recorded programs and leave the latest-recorded program. The recording function unit 56a serves a resume function when the broadcast receiver 11 returns to a viewing state for the recorded program after the broadcast receiver 11 is switched to a state of viewing of a program being now on air. A storage capacity to be secured on a hard disk by the recording function unit 56a is sufficiently smaller than that to be secured on the hard disk by the automatic recording function unit 56b.

Figure 3:
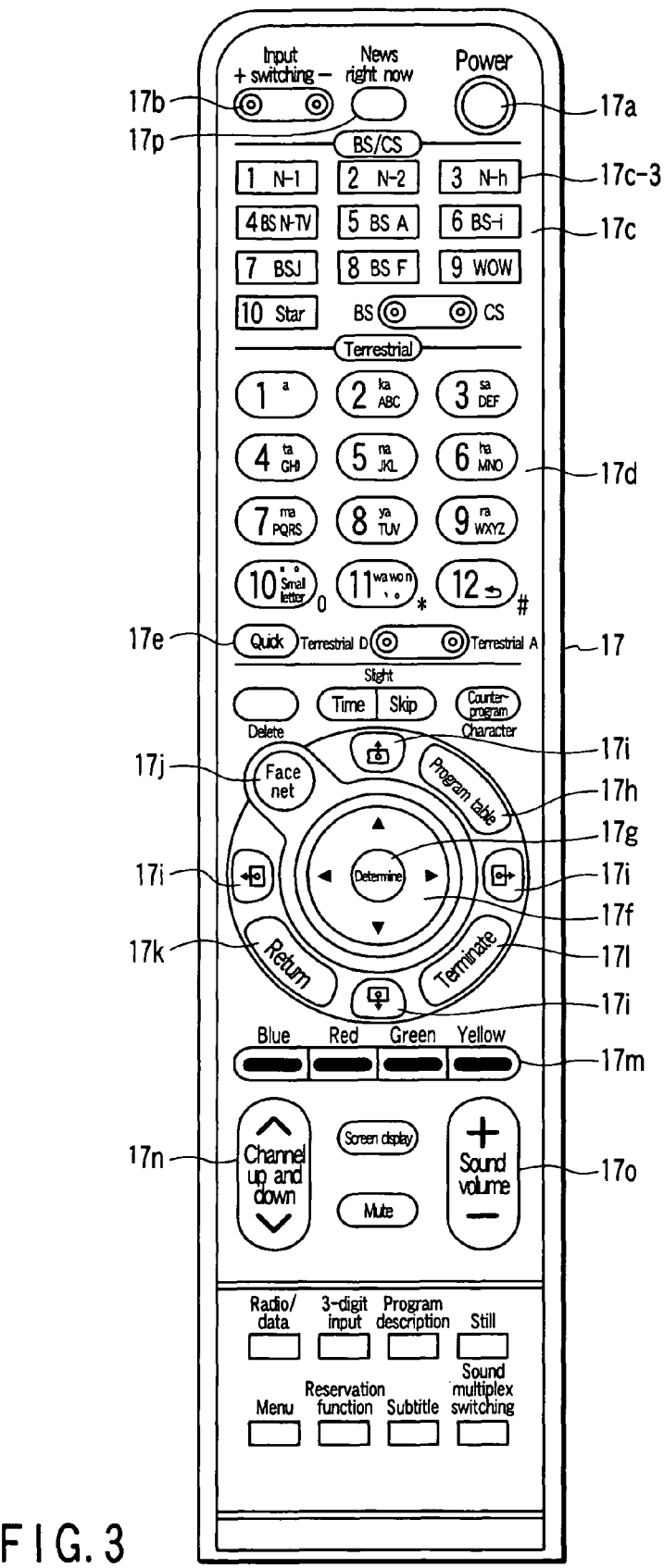
FIG. 3 is an exemplary view for explaining an external view of a remote controller used in the broadcast receiver of the present invention.

FIG. 3 shows an external view of the remote controller 17. The remote controller 17 mainly comprises a power key 17a, input switching keys 17b, direct tuning keys 17c for satellite digital broadcast channels, direct tuning keys 17d for terrestrial broadcast channels, a quick key 17e, a cursor key 17f, a determination key 17g, a program table key 17h, page switching keys 17i, a face net (registered trademark) (navigation) key 17j, a return key 17k, a terminate key 17l, color keys in blue, red, green and yellow 17m, a channel up and down key 17n, a sound volume adjusting key 17o, a "Slight time" key 17q, a "Slight skip" key 17r and a "Latest News" key 17p, etc.

Figure 4:
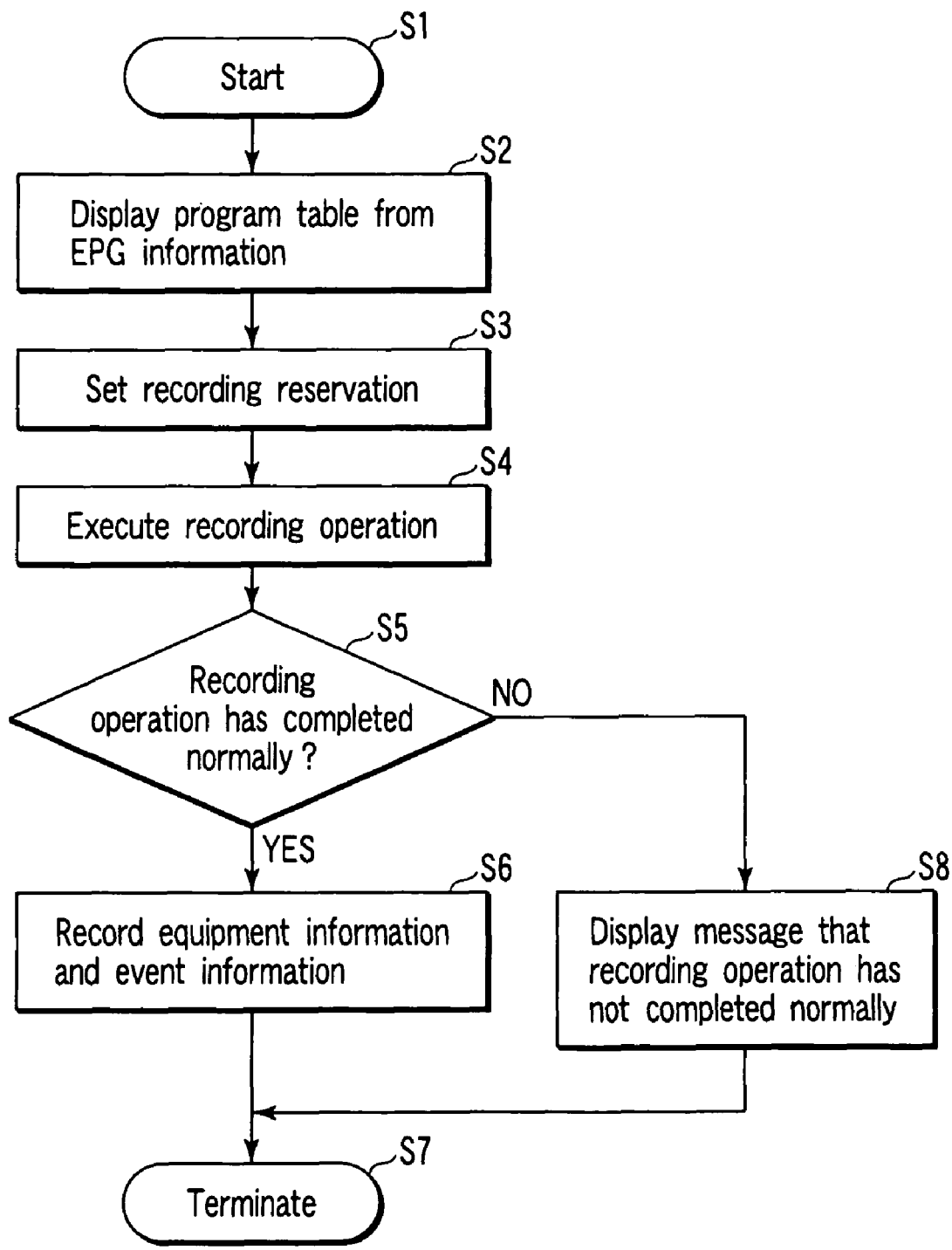
FIG. 4 is an exemplary flowchart when the broadcast receiver in FIG. 1 records a program on the basis of EPG information.
Figure 5:
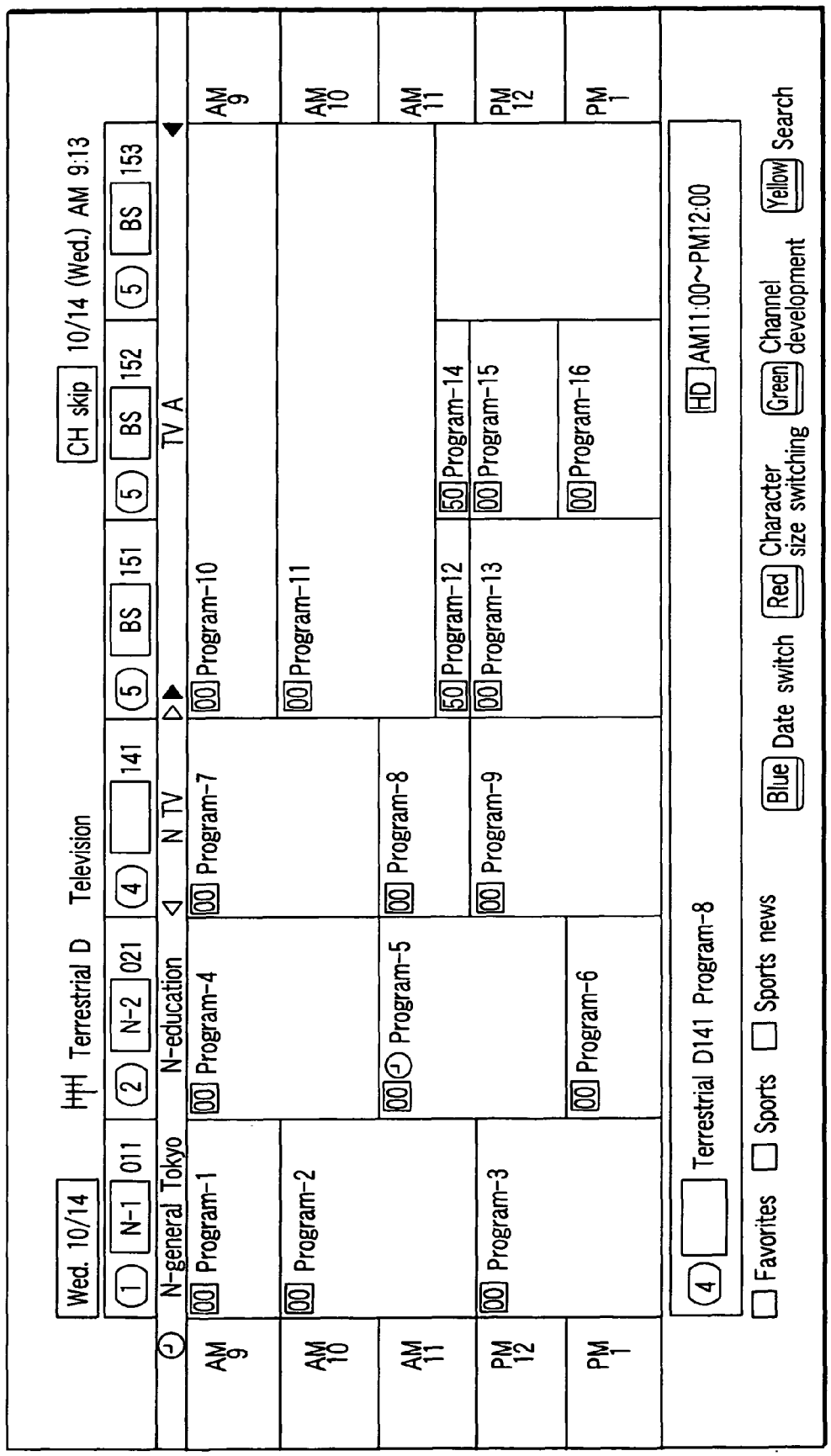
FIG. 5 is an exemplary view for explaining an example when a video display unit of the broadcast receiver in FIG. 1 displays program information.

FIG. 4 shows a flowchart for explaining the operations of the broadcast receiver 11 in recording a program into the digital recording equipment with each of the equipment connected to the terminals 21-24 of the broadcast receiver 11. When processing is started resulting form a request of the recording of the program (step S1), the control unit 56 of FIG. 2 displays the program table as shown in FIG. 5 on the video display unit 14 on the basis of electronic program guide (EPG) information acquired from the broadcast signal (step 2).

The user then makes recording reservation setting of the desired programs on the basis of the displayed program table (step 3). In this setting, the broadcast receiver 11 selects the program to be recorded from the program table and also selects to set the digital recording equipment to which the reservation-set program is recorded.

The control unit 56 executes a recording operation so as to record the reservation-set program into the reservation-set digital recording equipment when it has reached the preset time set for the recording reservation (step S4).

The control unit 56 then determines whether or not the program recording operation has normally completed, and if it is determined that the recording operation has completed normally (Yes, in step S5), the broadcast receiver 11 records equipment information (equipment ID, equipment name, shared folder name, etc.) to specify the digital recording equipment which has performed recording. The broadcast receiver 11 further records event information (event ID, channel number, title, content description, category, recording range, image quality mode, etc.) related to the recorded program into the nonvolatile memory 59 (step S6) and terminates this processing (step S7).

If it is determined that the operation has not completed normally (No, in step S5), the control unit 56 of FIG. 2 displays a message indicating the fact that the operation has not completed normally onto the video display unit 14 of FIG. 1 (step S8) and terminates this processing (step S7).

According to the above-mentioned recording operations, the user can arbitrarily select multiple sets of digital recording equipment connected to each terminal 21-24 of the broadcast receiver 11 and record programs sequentially.

Figure 6:
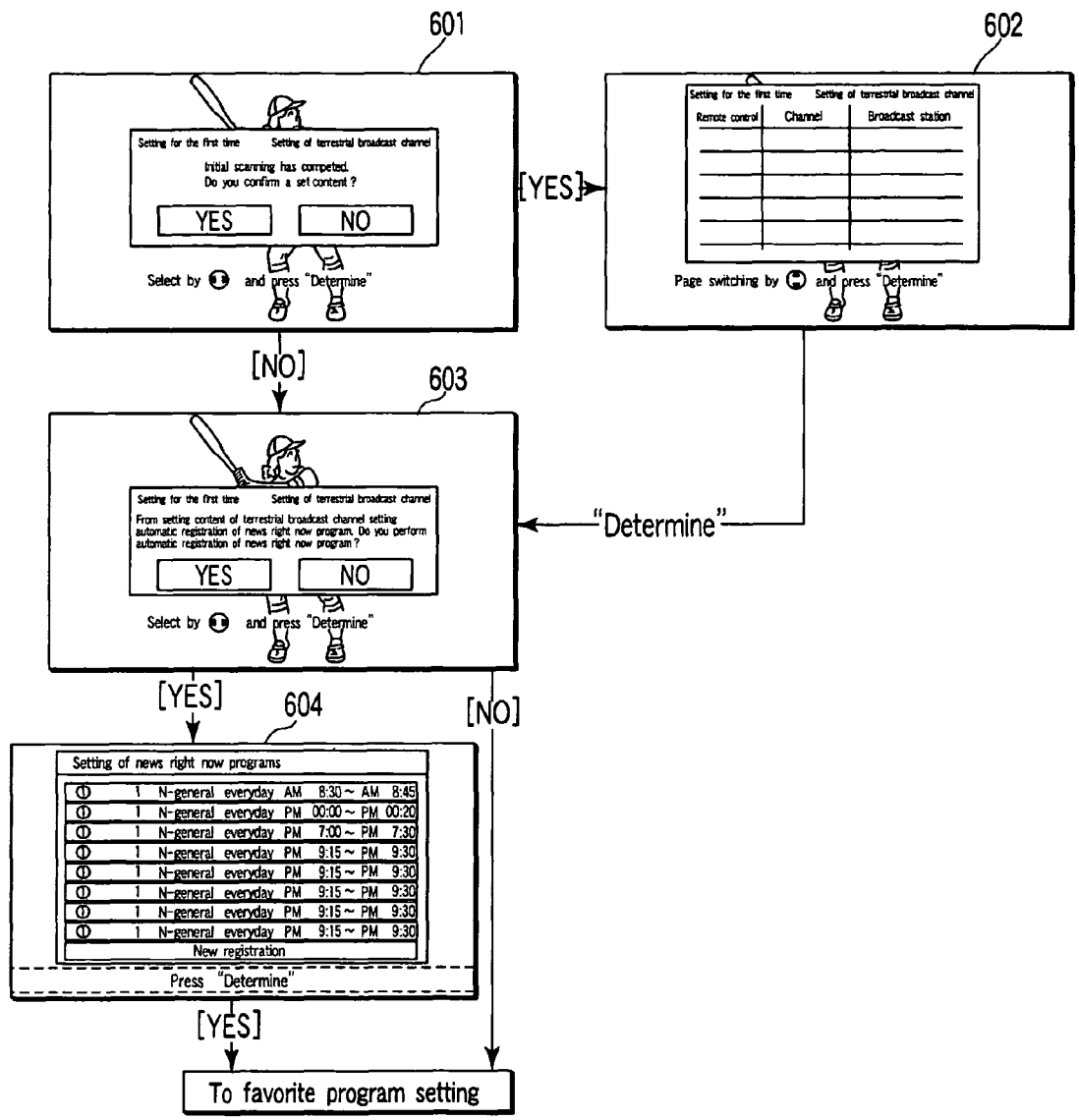
FIG. 6 is an exemplary view for explaining an example when an automatic recording function unit constituting a featured part of the broadcast receiver regarding the present invention is operated.

FIG. 6 shows another method for making a recording reservation for programs. The recording function according to this recording reservation has the following features.

The recording function is characterized in that it groups a plurality of items of program recording reservation information, records the reserved programs onto the recording medium and leaves at least the latest program among the grouped programs, and deletes the others.

The "Latest News" key 17*p* provided with the remote controller 17 (FIG. 3) is operated so as to operate this recording reservation function. The operation of the "Latest News" key 17*p* causes to operate the automatic recording function unit 56*a* in the control unit 56 and display a screen 601 in FIG. 6. The screen 601 displays, as guides, expressions of "Setting for the first time", "Setting of terrestrial broadcast channel", "Initial scanning has completed" and "Do you confirm setting content?" It also indicates selection buttons of "YES" and "NO", and a mark of the cursor key 17*f* for usage guidance of this recording function unit 56*a*. Now, it is assumed that the user selects the button of "YES" then the screen 601 switched to a screen 602 to display how the layout of the screen 602 is.

The user may switch pages by using the cursor key 17*f* from the screen 602. If the user presses the determination key 17*g*, the screen 602 is switched to a screen 603. The user can switch the screen 601 to the screen 603 by selecting the button "NO" on the screen 601 and press the determination key 17*g*. The user can also shift to the screen 603 by selecting the button for "NO" on the screen 601 to press the determination key 17*g*.

The screen 603 displays the following contents, as a guide,: "Setting for the first time, Setting of terrestrial broadcast channel, You may automatically record 'news program right now' from the content of setting of a terrestrial broadcast channel. "Do you start automatic recording of 'news program right now'?" In the display state of the screen 603, if the user selects the button "YES", a list of programs reserved for recording which is set by default, as shown on a screen 604.

Here, the user may make a reservation for a plurality of news programs of the N-1 general channel differing in time slot with one another. The list is indicated in order of the number of the direct selection keys 17*c* of the remote controller 17, the channel number, the name of the broadcast station, the broadcast time slot, from the left. If the user presses the determination key 17*g* in the display state of the screen 604, the news programs indicated on the screen 604 are registered as the recording reserved programs. The screen 604 then shifts to a screen of a favorite program setting state (for example, screen in FIG. 5).

At this point, following functions or conditions are given in the above-mentioned setting. That is:

(a) News programs to be periodically recorded are set in the menu of "Setting of 'news program right now'";
(b) The longest recording time for one program is 90 minutes;
(c) Recording of 9 program items at maximum is available;
(d) Registration of reserved news program is available by selecting an item of "new registration" (this function will be described later);
(e) Selection of cancellation or maintenance of reservations is available by selecting any item of already registered programs from a list;
(f) Display of, for example, "Registration is not available because the recording times are double-reserved" is indicated if the programs are overlapped as a result of a new registration; and
(g) Display of a message such as "Registration of this program is not available because of insufficient space on built-in HDD. Please retry to register it after deleting a recorded program", if a capacity to record a 'news program' cannot be secured due to the lack of space on the HDD.

The basic concept of above mentioned invention includes following matters.

A program reservation information registration unit registers a group recording reservation of a part of a plurality of recording reservations. A recording control unit records reserved programs corresponding to the group recording reservation on a recording medium. A reproduction control unit reproduces the program at the last recorded according to the group recording reservation on the recording medium when a predetermined user operation is performed. And an output unit which outputs an output reproduced by the reproduction control unit to a display unit.

However, the program reservation information registration unit may register at least one recording reservation of a part of a plurality of recording reservations. In this case, the recording control unit records reserved programs corresponding to the recording reservation on a recording medium.

Figure 7:
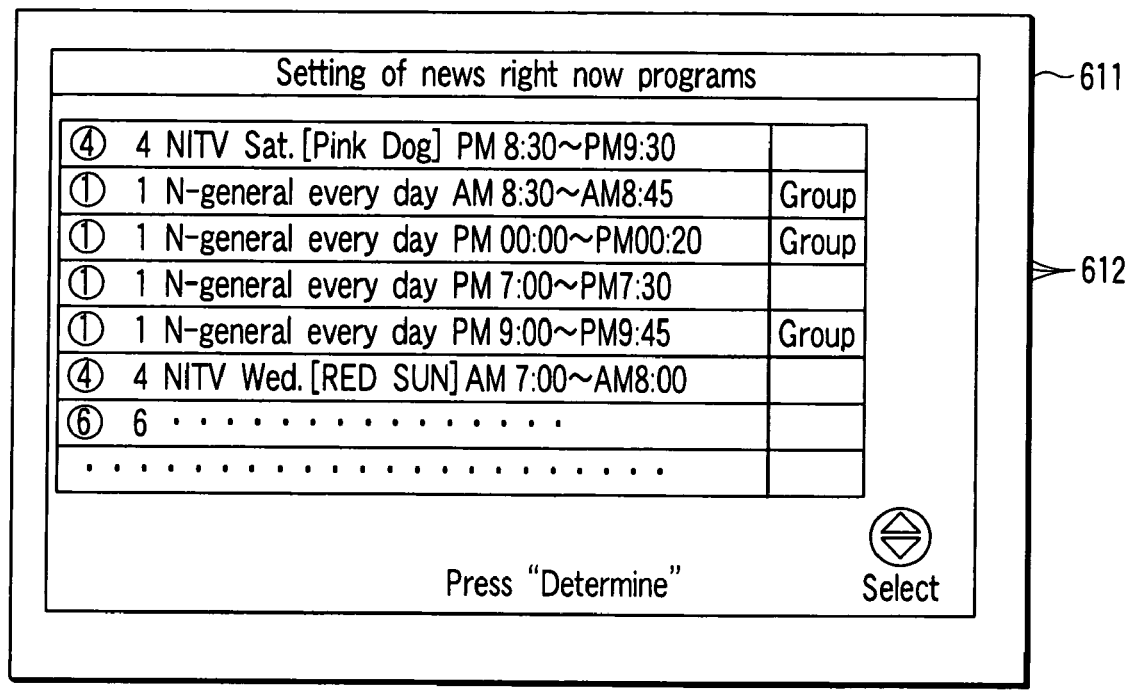
FIG. 7 is an exemplary view for explaining another example of a screen when the automatic recording function unit is operated.

FIG. 7 shows a screen for explaining the method to register at least one recording reservation or one or more recording reservation which is a part of the plurality of recording reservations. The plurality of recording reservations is ordinarily program recording reservation information.

Items of "Setting of 'news program right now'" and ordinarily program recording reservation information are displayed on the screen 611. A user operates the remote controller, and points the desired program recording reservation information by moving the cursor. After this operation, the user pushes the decision key. As the consequence, one or more recording reservation is resisters.

Figure 8:
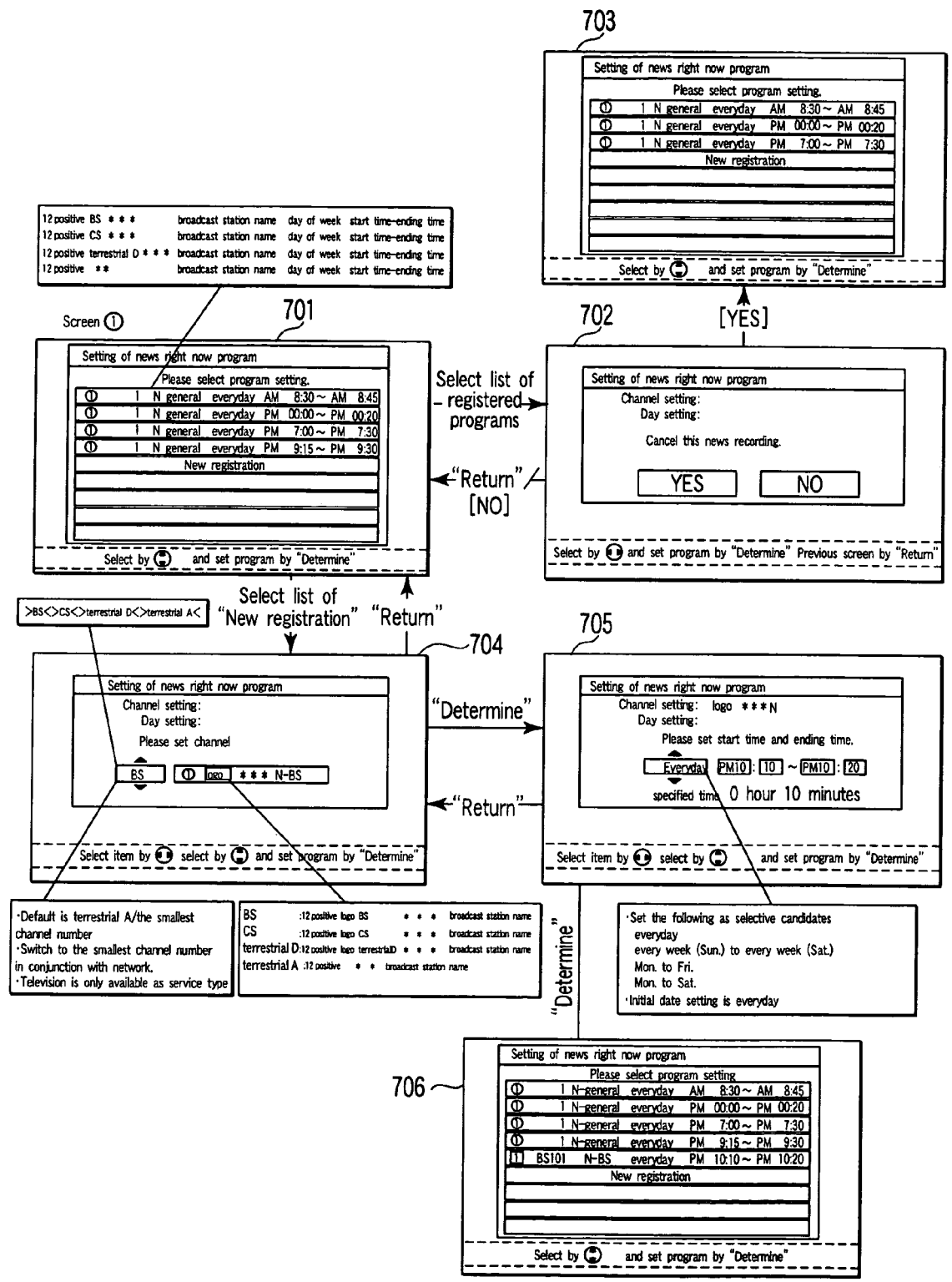
FIG. 8 is an exemplary view for explaining another example of a screen and an example of setting and deleting of reservation information for a "Latest News" program when the automatic recording function unit constituting the featured part of the broadcast receiver regarding the present invention is operated.

FIG. 8 shows an example of a screen for explaining functions to delete program reservation information registered.

When the user operates the "Latest News" key 17*p*, a screen 701 is displayed. At this moment, items of already registered program reservation information and newly registered items are indicated. For example, some programs have already been registered by default. At this time, when the user selects an item 701*a* of the reserved program reservation information (indicated on the screen 701 in a highlighted color) by moving the cursor key 17*f* to press the determination key 17*g*, the screen 701 is shifted to a screen 702. The operation of the cursor key 17*f* causes a movement of the cursor key 17*g*. The screen 702 indicates an inquiry about the interruption of the recording relating to the selected program reservation information. If the user moves the cursor by using the cursor key 17*f* to select the button "YES" and press the determination key 17*g*, then the screen 702 is shifted to a screen 703. That is, a state in which the item 701*a* of the program reservation information that has already been selected on the screen 701 is deleted is caused. If the user selects the button "NO" and presses the determination key 17*g*, the screen 702 returns back to the screen 701.

Next to this, on the screen 701, when the user selects an item 701*b* indicated as "New registration" by means of the cursor key 17*f* and presses the determination key 17*g*, the screen 701 shifts to a screen 704.

On the screen 704, the user decides the kind of a broadcast to be received (the kind includes BS broadcast, CS broadcast, terrestrial digital broadcast and terrestrial analog broadcast). Next, a remote controller number, a receiving channel, etc., are decided. An operation of the determination key 17*g* on the screen 704 makes a shift to a screen 705. At this time, the determination key 17*g* sets setting of a recording date (every day or day of week) and time slot (start time and ending time). A press of the determination key 17*g* on the screen 705 makes a shift to a screen 706 to display a list of the items of the program reservation information already registered.

The user may operate the return key 17*k* of the remote controller 17 in order to return back from the screen 705 to the screen 704 or from the screen 702 to the screen 701. A screen shift is not executed and an alarm is displayed or an alarm sound is output, in the case of insufficient setting information when the screen 704 shifts to the screen 705 and when the screen 705 shifts to the screen 706, or in the case of a overlapped-reservation of the recording time slot with other registered time slots.

Figure 9:
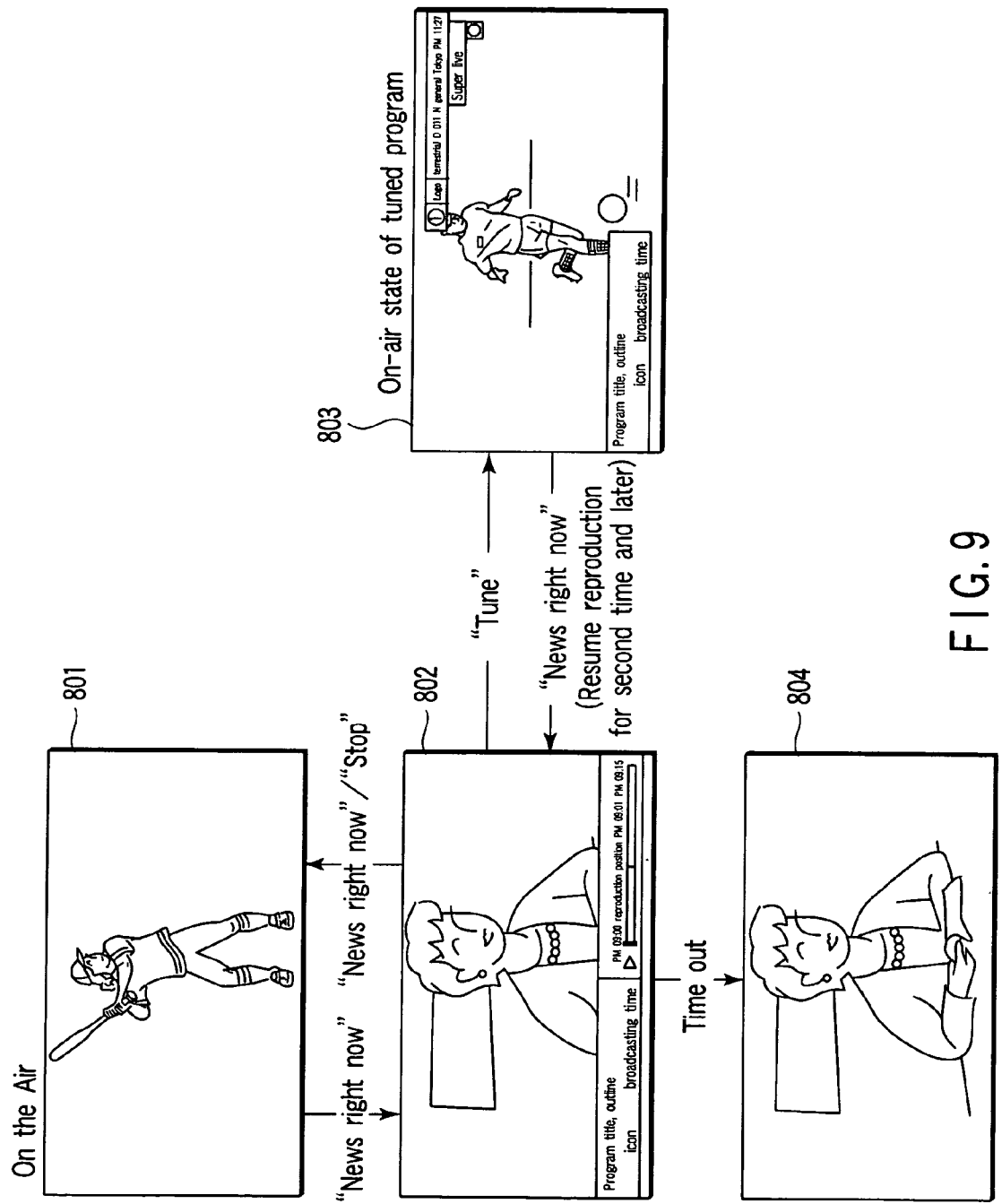
FIG. 9 is an exemplary view for explaining yet another example of a screen and a reproduction situation of a recorded "Latest News" program when the automatic recording function unit constituting the featured part of the broadcast receiver regarding the present invention is operated.

FIG. 9 shows an example of the case of viewing of a recorded program. A screen 801 shows an on-air state of a program. Here, if the user presses the "Latest News" key 17p of the remote controller 17 the reproduction of the latest-recorded news program is started, as shown on the screen 802. During an initial period of the reproduction, a broadcast time slot in which the news program has been broadcasted is indicated as a situation display at the lower part of the screen 802. In the example shown in FIG. 9, the broadcast time slot is that of PM 09:00 to PM 09:15. And, the time corresponding to a reproduction position is displayed simultaneously. In the example shown in FIG. 9, the time corresponding to a reproduction position is PM 09:01. After the elapse of a prescribed time period, the program information on the news program disappears from the screen, as shown on a screen 804.

A pressing of the "Latest News" key 17p on the screen 802 or the screen 804 causes an on-air display state of the selected program (refer to the screen 803). In addition, if the user presses the "Latest News" key 17p on the state (screen 803), the screen 803 returns again to the screen 802 or the screen 804.

At this time, during the viewing of the 'Latest News program', when shifting to on-air display then returning back to the viewing state of the 'Latest News program' for the second time, the broadcast receiver 11 operates the resume function.

The automatic recording function unit 56a as the "Latest News" processor greatly differs from usual recording function units which record and save all programs already reserved for recording. The recording function unit 56a is independently provided from the second recording function unit. The recording function unit 56a has the function to automatically delete the old recorded programs and leave at least the latest-recorded program. In the reproduction state of the old recorded programs, in the case of returning to the viewing state of the recorded programs again after switching to the viewing of the program being now on air, the resume function is activated. The recording capacity to be secured on the hard disk by the recording function unit 56a is sufficiently smaller than that to be secured on the hard disk by the second recording function unit.

Figure 10:
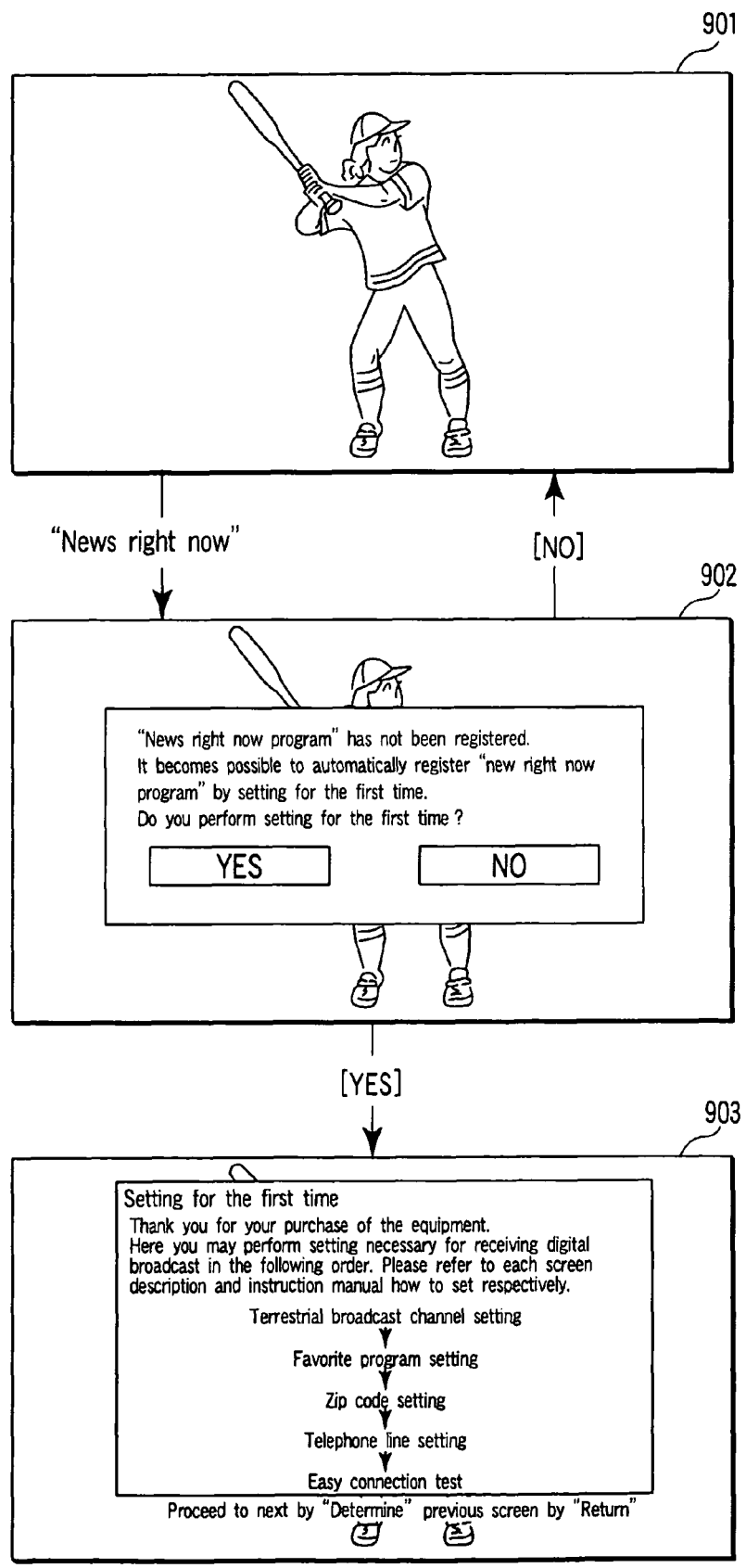
FIG. 10 is an exemplary view for explaining yet another example of a screen and an example of setting for the first time of "Latest News" recording when the automatic recording function unit constituting the featured part of the broadcast receiver regarding the present invention is operated.

FIG. 10 shows a guide example when the "Latest News" key 17p is pressed without the reservation information by default, as shown on the screen 701 in FIG. 8. If the "Latest News" key 17p is pressed on a screen 901 of FIG. 10, the screen 901 shifts to a screen 902. Here, a guide is indicated while an on-air image is displayed in a background with a motion image. The guide is expressed as follows: "'News right now program' has not been registered. Automatic registration of 'Latest News program' is available by performing setting for the first time. Do you set for the first time?"

The selection of the button "NO" on the screen 902 by the user returns the screen 902 to the screen 901 and the selection of the button "YES" shifts the screen 902 to a screen 903. The screen 903 indicates the following contents such that "Setting for the first time. Thank you for your purchasing of the equipment. Now, we will proceed to necessary setting for receiving a digital broadcast in the following order. Please refer description of each screen and the instruction manual." "Terrestrial broadcast channel setting Favorite program setting Zip code setting Telephone line setting Easy connection test".

When pressing the determination key 17g on the screen 903, the screen 903 shifts to the next screen and the user can generate the recording reservation information of the desired program in the manner for the new registration as described for FIG. 8.

Figure 11:
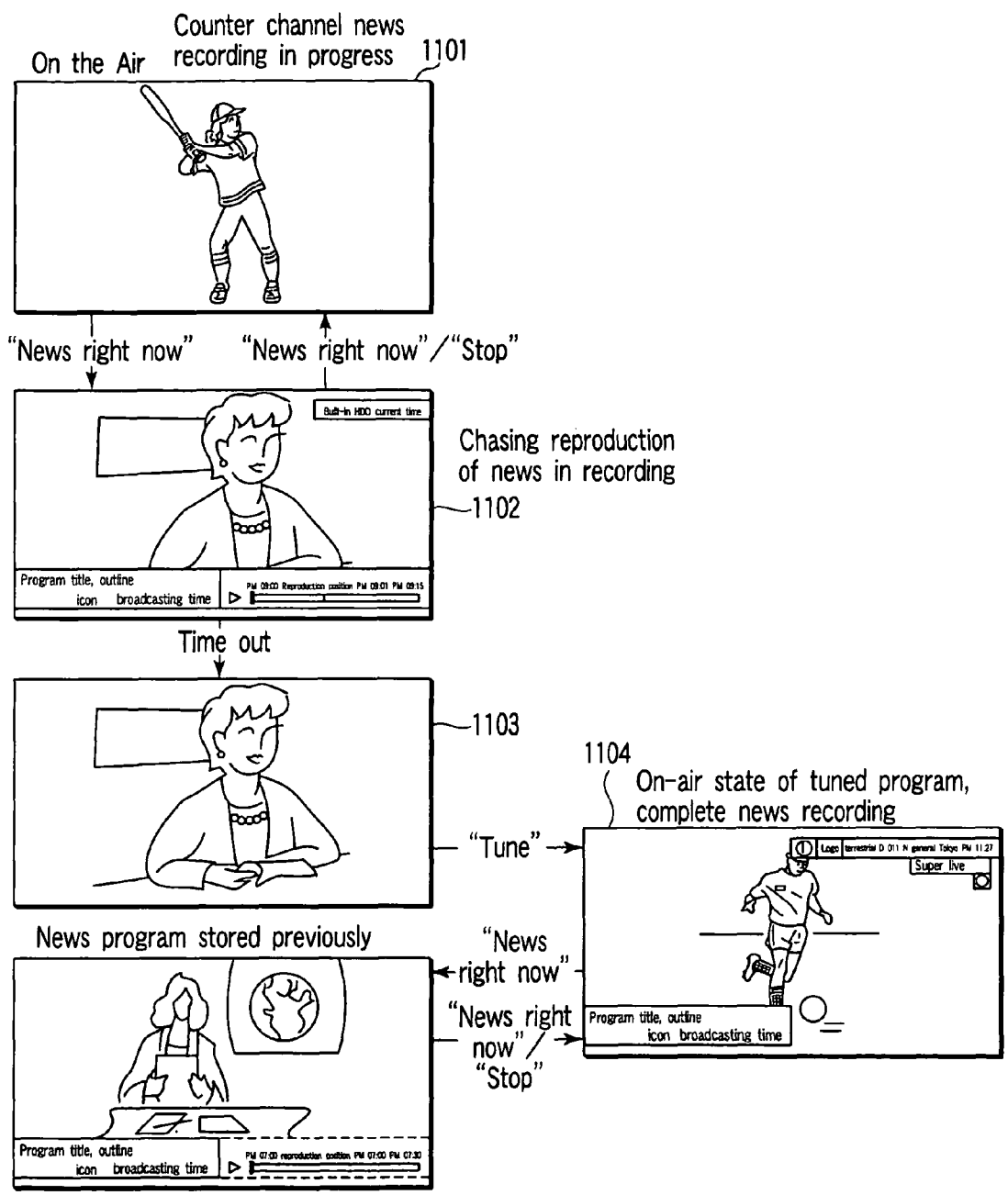
FIG. 11 is an exemplary view for explaining further another example of a screen of a screen and an example of a screen to perform a chasing reproduction when the automatic recording function unit constituting the featured part of the broadcast receiver regarding the present invention is operated.

FIG. 11 shows an exemplary view for explaining an example of other operations of the broadcast receiver 11 regarding the present invention. The pressing of the "Latest News" key 17p in the midst of recording of the news program, based on the reservation information, generates functions as follows.

A screen 1101 in FIG. 11 is a screen indicating an on-air state of a program. At this time, it is assumed that, in another channel, the broadcast receiver 11 is in the midst of current recording of the news program on the basis of the recording reservation information of "Latest News". If the "Latest News" key 17p is pressed, the screen 1101 makes a shift to a screen 1102. Then, the latest-recorded news program is reproduced. This news program is now in recording, so that the broadcast receiver 11 is brought into the chasing reproduction state.

The screen 1102 produces a display state indicating that the news program is in the middle of recording. A display state indicates a broadcast time slot in which the news program is broadcasted. In the example shown in FIG. 11, the time slot is that of PM 9:00 to PM 9:15. A time corresponding to a reproduction position is indicated simultaneously. In an example shown in FIG. 11, the time corresponding to the reproduction position is that of PM 09:01. After the elapse of a prescribed time period, the program information of the news program disappears from the screen, as shown on the screen 804.

However, if the screen 1102 indicates that the current actual time is AM 9:08, the status of the screens 1102 and 1103 is the chasing reproduction states. In the chasing reproduction state, when the user presses the "Latest News" key 17p, the screens 1102 and 1103 shift to an on-air screen 1104. It is assumed that when the screens 1102 and 1103 shifted to the screen 1104, the current time is past to AM 9:15 and the recording is terminated. If the user presses the "Latest News" key 17p again in the state of the display of the screen 1104, the screen 1104 shifts to a screen 1105 then shifts to the reproduction of the news programs which were stored previously. Such a time display is effective to make a reservation for recording, based on grouping of a plurality of programs. That is, the user can easily determine whether the user now views the latest-recorded program or views the news programs which were stored previously.

Figure 12:
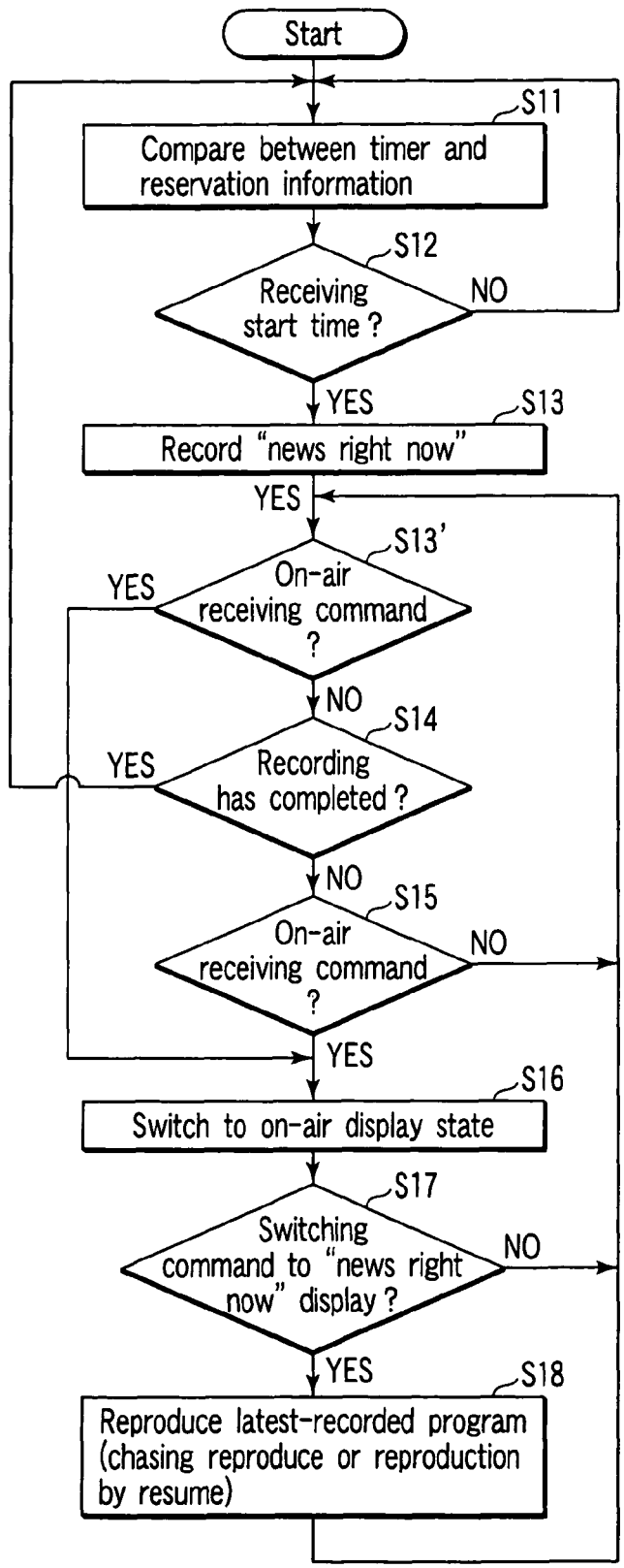
FIG. 12 is an exemplary view for explaining an example of a flowchart when the automatic recording function unit constituting the featured part of the broadcast receiver regarding the present invention is operated.

FIG. 12 shows an operation example of the automatic recording function part 56a included in the control unit 56 in FIG. 2. As described for FIG. 8, the recording function unit 56a compares the start time in the set reservation information to the time set by the timer (step S11), starts receiving when the recording start time arrives (step S12) and starts the recording of the "Latest News" program (step S13). After the termination of the recording, the recording function unit 56a brings the broadcast receiver 11 into a recording preparation state of the grouped next news programs (steps S14 and S11). Subsequently to the step S13 with the recording of the 'Latest News' program performed therein, the recording function unit 56a determines whether an on-air receiving command (selecting operation) has been issued or not (step S13'). In the case of issue of the receiving command, the recording function unit 56a makes a shift to a step S16 to switch over to an on-air display state. If the recording has not been terminated yet in the step S14, it is determined whether or not the receiving command has been issued (step S15). In the case of the issue of the receiving command in the step S15, the step S15 shifts to the step S16 to switch over to the on-air display state.

In the case of non-issue of the receiving command, the step S15 shifts to the step S13' to enter a stand-by state. Next, the recording function unit 56a determines whether or not a switching command for making switch-over to a "Latest News" display has been issued (step S17). If the switching command has not been issued, the on-air display is maintained unchanged. Otherwise stated, the step S17 shifts to a step S18 to start the reproduction by resuming or the chasing reproduction. After shifting to the step S18, the broadcast receiver 11 enters the stand-by state of the step S13'.

The present invention is not limited to the above-mentioned embodiment. The order of the step S13' and the step S14 may be changed and the step S15 may be omitted.

FIG. 13 shows a block diagram of functions included in the automatic recording function unit 56a constituting the featured part of the broadcast receiver of the present invention.

The control unit 56 includes the recording function unit 56a to function as the grouping recording reservation information processor. The recording function unit 56a differs from the ordinary automatic recording function unit (here, it is referred to as second automatic recording function unit 56b) to record and store all recording-reserved programs with reference to the electronic program table and the instruction manual. The recording function unit 56a is provided independently from the second recording function unit 56b. The recording reservation setting method of the second recording function unit 56b has been described in the description for FIG. 5.

In FIG. 12, when determining that it is the receiving start time as a result of comparison, the recording function unit 56a distinguishes that the reservation information is that of the ordinary automatic recording function unit or that of belonging to the recording function unit 56a. Based on the distinction result, if it is determined that the broadcast receiving 11 is now in the state of the recording of the 'Latest News' program differing in processing routine, the recording function unit 56a makes the shift to the flowchart shown in FIG. 12. However, in the case of the reservation information belonging to the second recording function unit 56b, the recording function unit 56a makes a shift to a routine perfectly differing from that of FIG. 12.

Next to this, the featured parts of the recording function unit 56a will be described collectively.

The recording function unit 56a includes a program reservation information resister 56a1 to register a plurality of items of program information as groups and set a plurality of reserved programs. The recording function unit 56a further includes a reserved program record control unit 56a4. The recording function unit 56a4 deletes old data among the recorded programs to record a new program in the vacated area or overwrite the new program onto the old data, if a recording area has been filled with data of programs recorded previously when the recording function unit 56a records a program into a preset recording area on the recording medium 25, based on the program information.

The forgoing 'preset recording area' may be an area fixed on the recording medium 25, and also may be an area not specified on the recording medium 25 and only of which the upper limit capacity is fixed in advance.

A latest program reproduction control unit 56a6 of the recording function unit 56a reproduces the programs recorded on the recording medium 25. A display output unit 56a9 of the recording-function unit 56a outputs an output reproduced by the reproduction control unit 56a6 to the video display unit 14. The reservation program recording unit 56a4 includes a means to record the reserved programs onto the recording medium 25, leave at least the latest program among the programs recorded on the recording medium 25 and delete the others. That is to say, the recording control unit 56a4 has a selecting function 56a5 between programs to be deleted and preserved.

The remote controller 17 has a one-touch key or a exclusive key ("Latest News" key 17p) which outputs a command so as to reproduce the latest program recorded on the recording medium 25, as mentioned above.

The display output unit 56a9 is provided with an accompanying display output switching function 56a10. The switching function 56a10 alternately switches over between a first state to reproduce the latest program recorded on the recording medium 25 and output it to the video display unit 14 and a second state to output the received signal from the receiving unit as an on-air output to the video display unit 14 by repeatedly operating the "Latest News" key 17p.

An interruption position information processing function 56a7 is further provided with the reproduction control unit 56a6. The information processing function 56a7 stores interruption position information of the latest program when the first state has been switched over to the second state and starts the reproduction again from the position based on the interruption position information when the second state has been switched over to the first state to reproduce the latest program.

The reproduction control unit 56a6 includes a chasing reproduction processing function 56a8 to the latest program recorded on the recording medium is reproduced when an operation of the one-touch key causes the first state to reproduce the latest program recorded on the recording medium and output the latest program to the display unit.

Although the news program is objected and grouped in the aforementioned embodiment, a weather forecast program may be useful instead of the news program. The combination of the weather forecast program and the news program may also be useful. In the case that only the latest program is required even if a program is one other than the news program, it is sufficient to register the reservation information of the foregoing program.

The broadcast receiver 11 regarding the present invention has the following functions. That is, the registration of the reservation information so as to record a plurality of programs like the screens 604 and 701 shown in FIG. 6 and FIG. 7, respectively, allows the broadcast receiver 11 to specify the preservation for the plurality of programs. In this case, the broadcast receiver 11 moves the cursor key 17f to the item of the desired reservation information to press a specifies key, for example, the yellow button of the remote controller 17 then conducts preservation setting. Then, the plurality of programs is preserved as long as the user does not release the preservation setting after the programs are recorded once. In other words, these programs are omitted from objects to be deleted and to be overwritten.

Figure 14:
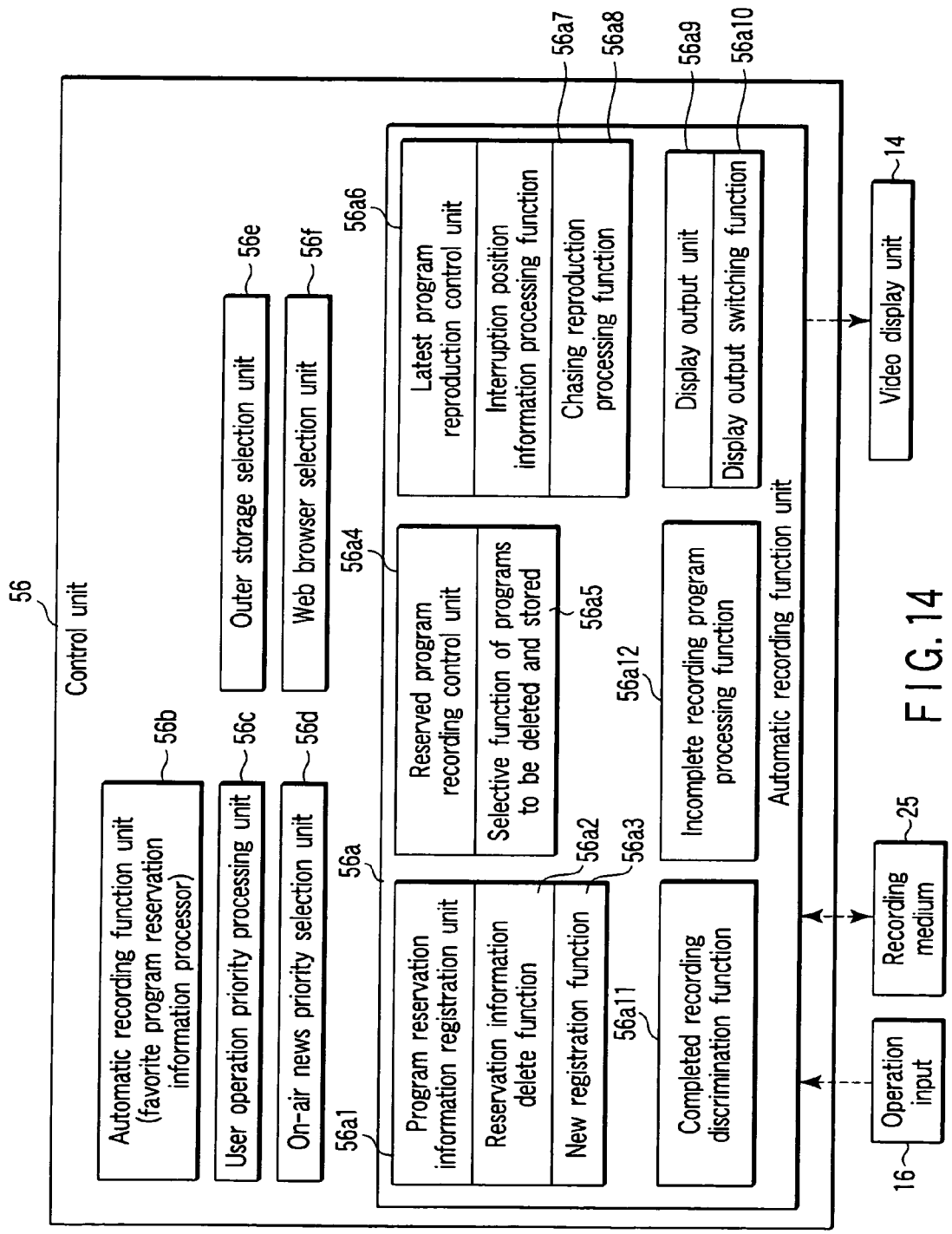
FIG. 14 is an exemplary view for showing another example of a block diagram of functions included in the automatic recording function unit regarding the present invention.

The present invention is not limited to the above embodiments. FIG. 14 shows another example of a block diagram of functions included in the automatic recording function unit 56. The automatic recording function unit 56 may be further provided following means. Now assume a curtain news program is recorded to the medium according to the group reservation and under the control of the automatic recording function unit 56. A news title is not stored if a recording scheduling period (for example ninety minute) is elapsed during the recording. A completed recording discrimination function 56a11 discriminates whether whole of the news program is completely recorded or not, and determines whether the news tile would be record or not.

The recoding operation of the recording function unit 56a is executed without user's senses. The user operation is not limited and affected by the recoding and reproducing under the control of the automatic recording function unit 56. For example, there are case that it differs between a selected channel selected by the recording function unit 56a and a selected channel selected by the user operation for an apparatus having a single tuner. In this case, the user operation is accepted in order of priority. The priority processing is performed by a user operation priority processing unit 56c.

When a news program which is now recording is stopped to recode in the state incomplete recoding, the news program is not subjected to register. And the incomplete recoding program is not subjected to reproduce according to "Latest News" key 17p. These functions are performed by an incomplete recording program processing function 56a12. The news program in the state incomplete recoding is the program which is not completed the record of the end of the program, during the predetermined period being elapsed.

Further, it may be provided an on-air news priority selection unit 56d which refers the data base of program information when the "Latest News" key 17p is operated. The on-air news priority selection unit 56d refers the data base and judges a news program being broadcasted current, it selects the channel for the news program. Therefore, the user can view the latest news program. Further, the reproduction control unit may include following unit. The unit refers the data base and executes a chasing reproduction of a program, when it judges the news program is current broadcasted and recorded on the recording medium.

Further, it may be provided an outer storage selection unit 56e which accesses an outer storage, if a news program which was recoded within two hours, for example, in past is not existed on the recoding medium 25.

Further, it may be provided a web browser selection unit 56f which browses a web-sight, if a news program which was recoded within two hours, for example, in past is not existed on the recoding medium 25. Further, as another embodiment, a video server is utilized as the program storage. For example, all programs of a specified category are recoded a recoding medium in the video server. When the key 17q is operated, for executing the function of "Latest News" viewing, the latest news program is selected from the recording medium and reproduced. In this case, the news program is associated with category information and recorded on the recoding medium.

As another embodiment, the latest bilingual program may be selected and reproduced. In this case, the program is not need a program of a part of recording reservation.

The present invention is not limited to the specific embodiment just as described above, and in the stage of the implementation, it is obvious that modifications and variations of the present invention are possible without departing from the sprit and the scope of the invention. It is further understood that a variety of inventions can be formed by appropriately combining a plurality of constituent elements disclosed in the foregoing embodiments. For example, some of the constituent elements may be eliminated from the entire constituent elements shown in the embodiments. Furthermore, the constituent elements extending over the different embodiments may be combined appropriately.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An automatic recording/reproducing apparatus, comprising:
   a program reservation information registration unit configured to register a recording reservation for programs including a predetermined content based on program information included in a broadcasting signal;
   a recording control unit configured to record reserved programs in order to broadcast on a recording medium, the reserved programs corresponding to the recording reservation, wherein an old recorded program is deleted or a new program is over written on the old recorded program, and at least a latest recorded program remains; and
   a reproducing control unit configured to reproduce a recorded program or a program which is to be recorded on the recording medium,
   wherein the reproducing control unit includes,
   a first module configured to resume a reproduction of a first program corresponding to the recording reservation, based on interruption information responding to a predetermined key-operation after the reproduction of the first program changed to the interruption state, and
   a second module configured to detect a recording state or a no-recording state of a second program which is newest, and to chase reproduction of the second program responding to the predetermined key-operation, without resuming reproduction of the first program, when the recording state of the second program is started after the reproduction of the first program was interrupted.

2. The apparatus according to claim 1, wherein the program reservation information registration unit registers a recording reservation for programs in a group of programs.

3. The apparatus according to claim 2, wherein the group of programs is related to a weather forecast or a news program.

4. The apparatus according to claim 1, wherein the predetermined key-operation is to operate a dedicated button provided on a remote controller.

5. The apparatus according to claim 4, wherein a letter indicating "News" lies on or near the dedicated button.

6. The apparatus according to claim 1, wherein information on the recording reservation includes reservation information specifying a predetermined category.

7. The apparatus according to claim 1, wherein the predetermined content is at least one of for a weather forecast and a news program.

8. A method of controlling an automatic recording/reproducing apparatus including a program reservation information registration unit configured to register a recording reservation for programs in a group of programs including a predetermined content based on program information included in a broadcasting signal, and a recording control unit configured to record reserved programs in order to broadcast on a recording medium, the reserved programs corresponding to the recording reservation, wherein an old recorded program is deleted or a new program is over written on the old recorded program, and at least a latest recorded program remains, and the recording control unit is configured to reproduce a recorded program or a program which is to be recorded on the recording medium, the method comprising:
   resuming a reproduction of a first program corresponding to the recording reservation, based on interruption information responding to a predetermined key-operation after the reproduction of the first program changed to the interruption state;
   detecting a recording state or a no-recording state of a second program which is newest, and chasing reproduction of the second program responding to the predetermined key-operation, without resuming reproduction of the first program, when the recording state of the second program is started after the reproduction of the first program was interrupted.

* * * * *